United States Patent [19]

Krüger et al.

[11] Patent Number: 4,748,615
[45] Date of Patent: May 31, 1988

[54] DIGITAL TDM SWITCHING EXCHANGE WHEREIN SWITCHING IS EFFECTED BY THE READ/WRITE SEQUENCES OF DATA STORES

[75] Inventors: Johann E. W. Krüger, Quickborn; Wolfgang E. Jasmer, Hamburg, both of Fed. Rep. of Germany

[73] Assignee: U.S. Philips Corp., New York, N.Y.

[21] Appl. No.: 929,930

[22] Filed: Nov. 12, 1986

[30] Foreign Application Priority Data

Nov. 26, 1985 [DE] Fed. Rep. of Germany ....... 3541662

[51] Int. Cl.$^4$ ............................................. H04Q 11/04
[52] U.S. Cl. ......................................... 370/58; 370/64
[58] Field of Search ......................... 370/58, 64, 66, 68

[56] References Cited

U.S. PATENT DOCUMENTS

| | | | |
|---|---|---|---|
| 3,649,763 | 3/1972 | Thompson | 370/64 |
| 4,355,384 | 10/1982 | Genter et al. | 370/64 |
| 4,450,557 | 5/1984 | Munter | 370/64 |

*Primary Examiner*—Douglas W. Olms
*Attorney, Agent, or Firm*—Thomas A. Briody; Jack Oisher

[57] ABSTRACT

A central exchange comprising at its input end a change-over arrangement having a change-over switch for each input line and at its output end a change-over arrangement of an identical structure having a change-over switch for each output line, which are controlled in parallel. Each change-over switch sequentially supplies at its output the channels of a multiplex frame on the different input lines. For each input line a data store and a control store are assigned to the change-over switch at the input end, in a predetermined sequence for each instant, each data store storing the words of all channels of always one input line, but always a different frame. Consequently, all the data stores together contain the words of all the input lines from a number of consecutive frames equal to the number of input lines. The control stores have the same number of addresses as the data store and address these addresses in a similar way, but always shifted through one frame length from data store to data store. This provides a switching matrix in which no blocking occurs and which behaves as a single-stage switching matrix, so that the switching path is controlled without path search.

6 Claims, 1 Drawing Sheet

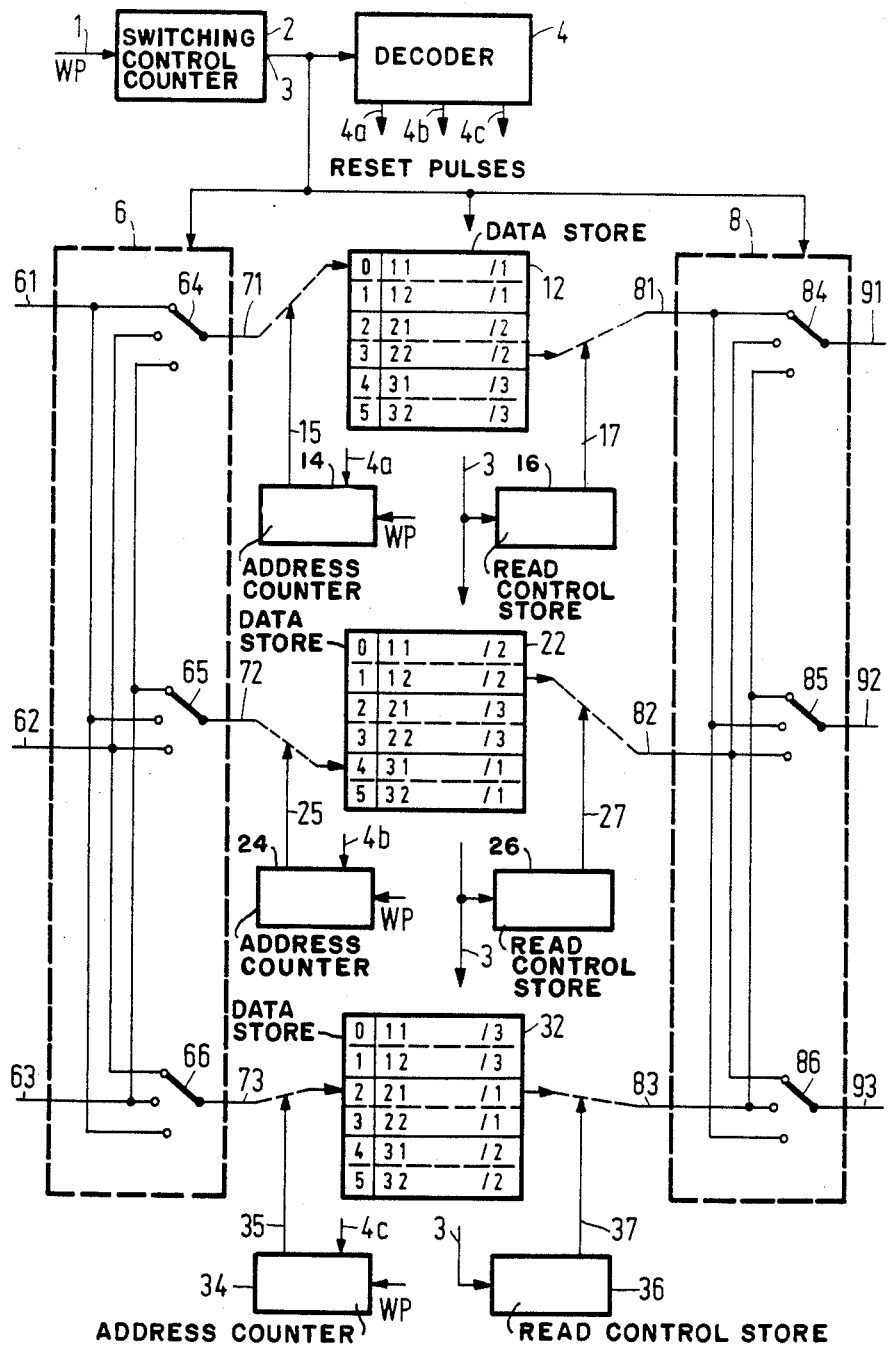

DIGITAL TDM SWITCHING EXCHANGE WHEREIN SWITCHING IS EFFECTED BY THE READ/WRITE SEQUENCES OF DATA STORES

BACKGROUND OF THE INVENTION

1. Field of the Invention

The invention relates to an exchange for the computer-controlled switching of digital time-interleaved data incoming in cyclically repeated frames in a number of input lines equal to the number of output lines via a switching matrix, which comprises at the input end a number of cyclically operated change-over switches in parallel which distribute the input data of the input lines frame-sequentially and cyclically over an identical number of input intermediate lines, a central stage connected to the input-intermediate lines and including data stores, in which the data paths to be switched are determined and which applies the data to a number of output intermediate lines equal to the number of input intermediate lines, at the output end, further cyclically operated change-over switches in parallel which distribute the transmitted data frame-sequentially and cyclically over the output lines on which the transmitted data appear.

2. Description of the Related Art

Such an exchange is disclosed in European Patent EP-OS No. 116 386 and the corresponding publication "IEEE International Conference on Comm. 1984", Volume 1, pages 299–302. Such an exchange behaves as a one-stage switching matrix in which consequently no path search is required, and, in addition, is of the non-blocking type. This known principle can also be used for larger numbers of channels or input lines. The central stage, that is to say the actual switching stage, is then a time-switching stage which includes a one-bit store for each channel. In addition to these data stores a large number of switches is however required, which together represent quite a considerable cost.

SUMMARY OF THE INVENTION

The invention has for its object to provide an exchange of the type defined in the opening paragraph, the switching stage of which requires less cost and design effort and more specifically can be realized with comparatively simple, conventional integrated circuits.

According to the invention, this object is accomplished in that for any combination of the connections of input lines to input-intermediate lines provided by the positions of the change-over switches at the input end, an identical combination of connections of output-intermediate lines is to output lines provided by the change-over switches at the output end, the sequence of the combinations always being the same. In the centre stage for each input-intermediate line a randomly addressable data store is provided which has a capacity to store the data of all the input lines during each frame and which stores the data of each one of further frames of each incoming line. An addressing arrangement cyclically drives all the data stores in the same address sequence but shifted through one frame, from data store to data store, to perform connection-dependent write and/or read operations.

The invention is based on the idea that within a frame period n channels can be switched in a time stage, n representing the number of channels of a line. Then, in a time interval of r frame periods, r n channels can be switched. This requires however time stages whose capacity must be increased by a factor of r, that is to say r n memory locations must be available in both the data store and in the control store controlling the addresses of the data store. Then r frames of one single line can be exchanged in a data store for a total of r frames of r different lines, but from each line only the $r^{th}$ frame is switched. To enable switching of all the frames r time stages or data stores are consequently required, which, not counting a time shift of the addresses at the input and output ends, respectively, are addressed in parallel. Thus a data store of a larger capacity than for the prior art data switching office is required, but no switches in the in the actual switching stage, but only the change-over switches at the input and output ends.

For the parallel addressing operation all the control stores receive the same address sequences, so that the switching computer must for each switching operation switch only one address which is the same for all the control stores, that is to say the switching exchange behaves for the external world as a single-stage exchange. For that purpose it is a requirement that for each position of the parallel-operated change-over switch at the output end where each input line is always connected to a predetermined input-intermediate line, there is a position of the change-over switch at the output end which is also operated in parallel, at which each one of the output-intermediate lines which are always associated with one input-intermediate line or the corresponding central stage, respectively, is connected to the output line corresponding to the input line. This can be easily realized in that it must be possible to apply in a 1:1 exchange all the data on the input lines in the same sequence to the corresponding output lines. The positions mutually assigned to each other, of the change-over switches at the input and output ends are, for the sake of efficiency, simultaneously assumed.

If the structure or the connection of the inputs to the terminals of the change-over switches themselves must be identical for the change-over switches at both the input and output ends, it is efficient to provide that in one position of the input and output change-over switches the input lines with the input-intermediate lines and simultaneously the output-intermediate lines with the output lines are always interconnected in an inverse sequence and that the connections in the other positions are obtained by a parallel shift of the connections in one position.

This means that in one position the first input line is, for example, connected to the last input-intermediate line, the second input line to the second last input-intermediate line etc. Thus, a particularly simple and well laid-out structure is obtained.

For the prior art arrangement an addressing mode of the switches which there determine the connection path is described in which a shift register is used. Such a shift register is also possible in switching exchanges according to the invention for controlling the data store addresses. However, an embodiment of the invention is characterized in that the addressing arrangement includes its own control store for each data store and/or the control stores receive the same sequence of data storage addresses. As a result thereof the information for the connecting path to be switched-through is indeed available as multiple information, namely once for each data store, but then the data store with its associated control store, which both operate at a very high rate, can be combined in one module. The information to be entered into the control store for setting-up a new connection needs only to be conveyed once from the switching computer in common for all the control stores, so that searching for a path by the single-stage method is no longer required.

Basically, sequences of data storage addresses both for writing and reading can be chosen independently of the connection to be switched-through, it then being necessary for the control store of each data store to contain the write addresses and also the read addresses. In accordance with a further embodiment of the invention a simple possibility is provided in which of the two sequences of data storage addresses for writing and reading one of these sequences is the natural address sequence of the data store, independent of the connections to be switched-through, and only the other sequence is determined by the connection to be switched-through. The determination of the other address sequences for the data stores is then unambiguously obtained without any further measures, without creating a blocking probability differing from zero. To produce the natural address sequences it is particularly efficient to provide that a control counter is assigned to each data store, which produces one of the two address sequences, and that the control counters always count shifted one-frame length relative to each other. This can easily be obtained in that the control counters are all provided with the same counting clock, but from different initial positions, or start counting at different starting instants.

Addressing the control store can be effected in several different manners. As for a cyclic control of the change-over switches at the input and output ends the most simple method is to use one common counter, it is efficient, in accordance with a further embodiment of the invention, to provide that all the control stores are jointly controlled by one address generator and that the same sequence of data storage addresses, always shifted through one frame, are applied to these control stores. This address generator is then the common counter for controlling the change-over switches. The information to be entered into the control store for setting-up a new connection can simultaneously be entered into all the control stores by a corresponding address switch, or the information is applied to all the control stores and is not entered therein until the addresses valid for each control store have just been generated, an address comparator then being required for each control store.

In accordance with a still further embodiment of the invention, it is efficient to provide that each control store is addressed by the associated control counter and all the control stores receive the same sequences of data storage addresses in the same control storage address. Then the shift in the addressing of the data stores via the correspondingly shifted addressing of the control stores is obtained by means of the control counters which count always shifted through one frame length. The information, that is to say the data store addresses for setting up a new connection is in this case entered simultaneously in all the control stores in the same control storage addresses.

BRIEF DESCRIPTION OF THE DRAWINGS

An embodiment of the invention will now be described in greater detail, by way of example, with reference to the single accompanying drawing, which shows a circuit diagram according to the invention for a simplified case in which three input lines and three output lines are used, each of these lines having two channels. It will however be obvious that the same principle also holds for a larger number of lines with a larger number of channels.

DESCRIPTION OF THE PREFERRED EMBODIMENTS

In the drawing the input lines are denoted by 61, 62 and 63, and it is assumed that the data are applied bit-sequentially, that is to say that each channel of each line is represented by a consecutive sequence of, for example, 8 bits, alternatively designated as a word. Always n channels or words (in the present example $n=2$) form in a conventional manner a multiplex frame. By means of prior art elements, not shown, the multiplex frames are synchronized with the local frame clock of the switching office and consequently have mutually equal phases.

The three input lines 61, 62 and 63 are connected to a change-over arrangement 6, provided at the input end, which comprises for each input line a change-over switch 64, 65 and 66 each having three positions corresponding to the three input lines. The outputs of the change-over switches 64, 65 and 66 are led-out as input-intermediate lines 71, 72 and 73 from the change-over arrangement 6. All three change-over switches 64, 65 and 66 are switched-through in parallel and consequently connect the three input lines 61, 62 and 63 in a cyclic sequence to the input-intermediate lines 71, 72 and 73, that is to say in one switching position the input line 61 is connected to the input-intermediate 71, the input line 62 to the input-intermediate line 73, etc. In the subsequent switching position the input line 61 is connected to the input-intermediate line 72, the input line 62 to the input-intermediate 71 etc. This results in the sequence of connections shown in the following Table 1.

TABLE I

| 61 | 71 72 73 |
|----|----------|
| 62 | 73 71 72 |
| 63 | 72 73 71 |

In the last position of the change-over switches 64, 65 and 66 the input lines 61, 62 and 63 are consequently connected in the inverse sequence to the input-intermediate lines 71, 72 and 73.

The change-over switches 64, 65 and 66 are controlled via the output 3 of a counter 2 which at the counting input 1 receives a word pulse WP at the start of each new channel or word on the input lines 61, 62 and 63. In the present case, the counter 2 has a capacity of two (channel number per input line) times three (number of input lines)=six positions, so that it effects a full cycle in three frames which will be designated superframes. At each new frame the switches 64, 65 and 66 are incremented one position, so that after a superframe they have again reached their original position.

Each of the input-intermediate lines 71, 72 and 73 is connected to the data input of an associated data store 12, 22 and 32 having a number of storage addresses for always one word, the addresses in these data stores being shown in the lefthand column. Addressing of the data store 12 is indicated by the broken-line connection to the input-intermediate line 71 and to the control connection 15, which originates from a control counter 14 counting the word pulses WP. In addition, the control counter 14 is reset to its starting position via a line 4a which originates from a decoder 4 which is also connected to the output 3 of the counter 2 and at the beginning of a new frame always produces a signal at the outputs 4a, 4b or 4c. More specifically, the signal at the output 4a is supplied before or at the beginning, respectively of the first frame of a superframe. In response thereto the data word of the first input line of the first channel of the first frame of a superframe is entered at the address 0 of the data store 12, as is illustrated by the numbers next to the address 0 in this data store 12. After the subsequent word pulse the control counter 14 has moved one counting position further and, via its connection 15, energizes the address 1 of the data counter 12, in which the second channel of the first frame of the first input line 61 is entered.

At the subsequent word pulse the control counter 14 is again incremented one position, but, in addition, the change-over switches 64, 65 and 66 are switched to their centre positions, so that the data word of the second input line 62 from the first channel of the second frame is entered at the address 2 of the data store 12. Entering data words in the data store 12 is continued in this way, so that at the end of a superframe the words denoted by the numbers in the drawing have been entered. At the start of the subsequent superframe the information contained in the data store 12 is always overwritten.

In a corresponding manner the data store 22 is addressed by a control counter 24 for entering the words present on the input-intermediate line 72, via the connection 25. This control counter 24 is also incremented one position at each word pulse WP, but is reset to its starting position at the beginning of the second frame of a superframe via the input 4b, so that at the beginning of a new superframe it energizes the address 4 of the data store 22 via the connection 25, as is shown in the FIGURE. As the change-over switch 65 connects at the beginning of each superframe the third input line 63 to the input-intermediate line 72, the word of the first channel of the first frame is entered from the third input line into this address 4. Subsequent thereto, in a similar way as described for the data store 12, the words from the input lines are entered in the data store 22, so that finally, as is also the case for the data store 12, the data store 22 always contains a word from each channel of each input line, but from a frame different from the frame for data store 12, as will be obvious when the numbers shown next to the addresses are compared with each other. Also the order of the words concerning the input lines and the channels therein is identical to the order of the words of the data stores 12.

The data store 32 is also controlled for the writing operation by a control counter 34, via the connection 35, this control counter 34 having been reset to its starting position at the beginning of the third frame via the line 4c. As a result thereof the control counter 34 addresses at the beginning of a new superframe via the connection 35 the address 2 of the data store 32, as is shown in the FIGURE, and enters therein the word of the first channel of the first frame of the second input line 62. At the end of a superframe the data store 32 also contains a word of each channel of each input line, but from a frame different from the frames for the other two data stores 12 and 22. In this manner the words of all the three input lines 61, 62 and 63 are stored during a superframe in all three data stores 12, 22 and 32 from three consecutive frames.

When the data stores 12, 22 and 32 are read, addressing is only effected via control stores, namely for data store 12 via the control store 16 and the connection 17, for the data store 22 via the control store 26 and the connection 27 and for the data store 32 via the control store 36 and the connection 37. In the example shown here, these control stores 16, 26 and 36 are also addressed via the output 3 of the counter 2. The content of the read control stores will be described in detail hereinafter.

The data outputs of the data stores 12, 22 and 32 are now connected to an intermediate-output line 81, 82 or 83, respectively, which represents inputs of a change-over switch 8 which is of a wholly identical structure as the change-over arrangement 6, namely incorporating three change-over switches 84, 85 and 85 which are controlled in a similar way as in the change-over arrangement 6 via the output 3 of the counter 2 and connect, for example, the output-intermediate line 81, one after the other, to the output line 91, thereafter to the output line 92 and then to the output line 93, and correspondingly also for the other output-intermediate lines 82 and 83. The same sequence of connections as for the change-over switch arrangement 6 is then obtained.

A detailed description of switching-through the individual connections is given with reference to the following Table 2.

TABLE 2

| Adrr. 3 | Adrr. 12 | Switched connection | Adrr. 22 | Switched connection | Adrr. 32 | Switched connection |
|---|---|---|---|---|---|---|
| 0 | 3 | 22/2 11/4 | 1 | 12/2 31/4 | 2 | 21/1 21/4 |
| 1 | 4 | 31/3 12/4 | 0 | 11/2 32/4 | 5 | 32/2 22/4 |
| 2 | 2 | 21/2 21/5 | 3 | 22/3 11/5 | 1 | 12/3 31/5 |
| 3 | 5 | 32/3 22/5 | 4 | 31/4 12/5 | 0 | 11/3 32/5 |
| 4 | 1 | 12/4 31/6 | 2 | 21/3 21/6 | 3 | 22/4 11/6 |
| 5 | 0 | 11/4 32/6 | 5 | 32/4 22/6 | 4 | 31/5 12/6 |

Therein the first column indicates the counter position occurring at the output 3 of the counter 2 and which at the same time constitutes the address of the individual read control stores 16, 26 and 36. The next column indicates the content of the control store 16, which represents the addresses supplied via the connection 17 for reading the data store 12. The column next to that defines the switch-through connection, denoted by the inpt line number and the channel number and, behind the stroke, the frame number. This is based on the content, shown in the FIGURE, of the data stores 12, 22 and 32 at a predetermined instant, namely at the end of a superframe comprising three frames, to which the count of the frame number relates. At the right-hand side of the third column showing the switched connections, the frame numbers are counted onwards by 4, 5 and 6, starting from the instant shown. The subjacent lines represent to a certain extent a time axis.

In a similar way the subsequent, fourth column represents the content of the control store 26, that is to say the sequence of the addresses driven via the connection 27 on reading of the data store 22. The then subsequent column indicates the connections which are switched via the data store 22 in the same way as the third column. The same holds for the sixth column, which indicates the content of the control store 26 for addressing the data store 32, and the last column shows the connections switched via this data store 32.

At the beginning of the fourth frame after the situation shown in the FIGURE, so before the new words of the input lines, that is to say the first channels of this fourth frame, are entered into the data store 12, 22 and 32, the address 0 is then available at the output 3 of the counter 2, and the corresponding control stores 60, 26 and 36 are driven thereby. In response thereto the data store 12 is read at address 3, and this read word originating from the second input line from the second channel of the second frame, is supplied on the first output line 91 in the first channel of the fourth frame. Consequently, this word is transferred from the second input line to the first output line with a delay of two frames less one channel.

At this instant the control store 26 reads from the address of the data store 22 the word coming from the first input line 61 from the second channel of the second frame, and transfers this word to the third output line 93 in the first channel of the frame 4. Here the delay in the transfer of this word from the input line to the output line also has a duration of two frame periods less one channel.

The control store 36 reads from the address 2 of the data store 32 the word which it has received from the second input line of the first channel in the first frame, and this word is supplied on the second output line 92 in the first channel of the fourth frame. In this word the switch-through delay from the input line to the output line amounts to three whole frame periods.

After the data stores 12, 22 and 32 have simultaneously been read in the manner described above, the words from the input lines of the first channel in the fourth frame are entered into addresses determined by the control counter 14, 24 and 34 and indicated by the arrows in the FIGURE. The contents of the data stores has now changed compared with the representation as regards the frame numbers. It should be noted that in the data store 32 information is immediately entered again at the same address 2 from which a reading operation has just been effected. In the example described this occurs indeed only at one address, but this may alternatively occur for each address, determined by the connections, so that the data stores 12, 22 and 32 must be such that, in the event of bit-sequential transfer of the words from the input lines to the output lines it must be possible that they are read and also written again at the same addresses, it alternatively being possible to reverse this sequence. For a bit-sequential switch-through it is in addition necessary for the individual bits of the words in the data stores 12, 22 and 32 to be individually addressed one after the other, so that in reading and writing of each word the bits are nested.

After a complete word has been read and entered again, the subsequent word pulse WP appears, in response to which the address 1 for the control stores 16, 26 and 36 appears at the output 3 of the counter 2. With this address the control store 16 addresses the address 4 of the data store 12, as a result of which the word of the first channel of the third input line of the third frame is transmitted through the first output line in the second channel of the fourth frame. This word is consequently only delayed by the duration of a frame plus a channel, which in this example provides the same delay as for the previously transferred word. Reading the other data stores is effected in a similar way, also for the subsequent addresses occurring at the output 3 of the counter 2, where it should be noted that each time after two addresses not only the change-over switches 64, 65 and 66 but also the change-over switches 84, 85 and 86 always switch one position further. In addition, for the further addresses at the output 3 of the counter 2 it should be taken into account that not always the words shown in the FIGURE are read from the data stores 12, 22 and 32 but that at the last addresses the words entered after the instant shown in the drawing, which consequently originate from the respective frames 4 and 5, are read. In the Table the frame number for these words are underlined.

The Table shows that the words of a predefined channel of a predefined input line are also transferred to the same output line in the same channel, and indeed always in the same frame sequence. This also shows that each channel of each input line can be switched to each channel of each output line, blocking then not being possible. To that end it is imperative that the individual control stores always address the associated data store, shifted through a frame, in the same address sequence as shown in the Table, as the address sequence for the data store 22 is shifted two positions, that is to say through one frame length downwards relative to the other sequence of the data store 12, the lower two addresses in the address sequence for the data stores being added at top to the address sequence for the data store 22. The same holds for the shift of the address sequence of the data store 32 relative to the address sequence of the data store 22 and, in this approach of the method, also for the shift of the address sequence of the data store 32 relative to the other sequence of the data store 12, so that a looped, cyclic shift is obtained. This is based on the assumption that the control stores 16, 26 and 36 are all addressed from the output 3 of the counter 2.

A further possibility is to address each control store from the associated control counter, more specifically the control store 16 from the control counter 14, the control 26 from the control counter 24 and the control store 36 from the control counter 34. In these cases all the control stores have the same contents relative to their addresses, and shifting the addressing of the data store during reading is effected by the shifted addressing of the control store, since the control counters 14, 24 and 34, as described in the foregoing, count after having been shifted relative to each other. This may be advantageous for entering the connection control information into the control store from the direction of a switching computer, not shown, as this computer can then write all the control stores at the same address. The sequence of the transmission of words during the switching operation is not changed then.

So far the description was based on a bit-sequential switching of the words. For lines having very high bit rates the possible switching rates of the change-over switches 64 to 66 and 85 to 88, and also the operating rate of the data store and the control stores can be exceeded. In this case it is then more advantageous to convert in parallel the words of the individual channel which arrive at the external input lines bit-sequentially and to switch them bit-parallel in the arrangement shown and described. The change-over switches 64–66 and 85–86 must then be of a correspondingly multiple construction, namely one switch for each bit, and likewise the input lines 61 to 63, the intermediate lines 71 to 73 and 81 to 83 and also the output lines 91 to 93 must indeed consist of a number of parallel lines corresponding to the number of bits per word. In contrast thereto, no change is required in the capacity of the data stores 12, 22 and 32 and also of the control stores 16, 26 and 36, as in any case all the data stores together must simultaneously store the words of all the input lines of a number of frames equal to the number of input lines.

The architecture described in the embodiment described in the foregoing as regards the sequence of the connections effected by the change-over switch and consequently the sequence of the values of the individual input lines, stored in the data stores, can also be modified, more specifically such that the input lines 61 to 62 are connected on a different manner to the individual change-over switches 64 to 66. The change-over switches 64 to 66 can also be provided inversely, that is to say each input lines 61 to 63 is connected to a change-over switch. Of basic importance is that each data store always contains the same quantity of information from all the input lines and all the data stores 12, 22 and 32 contain the information components of the input lines in mutually the same sequences also as regards the channels, so that all the control stores also contain the same sequences of addresses, possibly shifted relative to each other, so that these addresses for setting-up the connection can be uniformly entered into the control stores. In addition, the connections effected by the change-over switches at the output end must be matched to those of the change-over switches at the input end, that is to say always the same combinations of connections must be switcheable.

The arrangement described in the foregoing behaves as a single-stage switching matrix without internal blocking. The cost and design effort required for the change-over switches is limited, as they can be realized with conventional, integrated standard modules, particularly in the form of what are commonly referred to as multiplexers or demultiplexers, whilst customary integrated storage circuits can also be used for the data stores and the control stores. Since the arrangement behaves as a single-stage switching matrix, no path-searching facility is required, and each connection is only determined by one single value, namely an address which is the same in all the control stores, for the data stores.

What is claimed is:

1. A computer-controlled central switching exchange for switching digital time-interleaved data incoming in cyclically repeated TDM frames on a number of input lines of such exchange to an equal number of output lines of such exchange by means of a switching matrix, which exchange comprises:
   input change-over switches operating in parallel and which cyclically switch the data frames on each input line of the exchange frame-sequentially over each of a number of intermediate input lines of said matrix, the number of matrix input lines being equal to the number of exchange input lines;
   a central switching stage connected to the matrix input lines and including data stores, such central switching stage distributing the data frames on the matrix input lines over an equal number of matrix intermediate output lines, such distribution being determined in accordance with the connections to be established between the exchange input lines and the exchange output lines; and
   output change-over switches operating in parallel and which cyclically switch the data frames on each of the matrix intermediate output lines frame-sequentially over each of the output lines of the exchange;
such exchange being characterized in that:
   (a) the sequence of connections of the exchange input lines to the matrix intermediate input lines provided by the input change-over switches is identical to the sequence of connections of the matrix intermediate output lines to the exchange output lines provided by the output change-over switches;
   (b) the central switching stage comprises, for each matrix input line, a randomly addressable data store which, during each cycle of the input change-over switches, stores in respective addresses therein the data frames on all of the exchange input lines which are connected to such matrix input line during such cycle; and
   (c) the central switching stage further comprises an addressing arrangement which cyclically addresses all the data stores in the same address sequences but shifted by one data frame in the successive data stores, one of such sequence being for reading data frames from the data stores and another of such sequences being for writing data frames into the data stores, such sequences being set in accordance with the connections to be established between the exchange input lines and the exchange output lines.

2. A central switching exchange as claimed in claim 1, characterized in that in one position of the input and output change-over switches the sequence of connections of the exchange input lines with the matrix intermediate input lines is the reverse of the sequence of the connections of the matrix intermediate output lines with the exchange output lines; and in succeeding positions of the input and output change-over switches after such one position thereof the sequences of such connections are successively shifted in parallel.

3. A central switching exchange as claimed in claim 1, characterized in that the addressing arrangement comprises respective read control stores for the respective data stores, and all such read control stores contain identical sequences of data store addresses.

4. A central switching exchange as claimed in claim 1, characterized in that one of said sequences of data store addresses is in consecutive order independent of the connections to be established, and another of said sequences of data store addresses is set in accordance with the connections to be established between the exchange input lines and the exchange output lines.

5. A central switching exchange as claimed in claim 4, characterized in that respective address control counters are provided for the respective data stores, each address control counter producing one of the two address sequences for the associated data store, the data frame sequences produced by such address sequences being shifted by one data frame with respect to each other.

6. A central switching exchange as claimed in claim 3, characterized in that all of the read control stores are controlled jointly by a switching control counter and contain identical sequences of data store addresses but shifted by one data frame with respect to each other.

* * * * *